(12) United States Patent
Marquinet

(10) Patent No.: US 6,329,010 B1
(45) Date of Patent: Dec. 11, 2001

(54) PROCESS FOR PRODUCING A FOOD COLORANT, COLORANT THUS OBTAINED AND USES THEREOF

(76) Inventor: Jose Iñaki Alava Marquinet, Paseo Heriz, Villa Aloña, 20008 Donostia, Guipuzkoa (ES)

( * ) Notice: Subject to any disclaimer, the term of this patent is extended or adjusted under 35 U.S.C. 154(b) by 0 days.

(21) Appl. No.: 09/355,087

(22) PCT Filed: Nov. 19, 1998

(86) PCT No.: PCT/ES98/00314

§ 371 Date: Jul. 20, 1999

§ 102(e) Date: Jul. 20, 1999

(87) PCT Pub. No.: WO99/26489

PCT Pub. Date: Jun. 3, 1999

(30) Foreign Application Priority Data

Nov. 24, 1997 (ES) .................................... 9702447

(51) Int. Cl.⁷ ............................. A23L 1/27; A23L 1/275
(52) U.S. Cl. ........................ 426/540; 426/655; 426/250; 8/438; 8/646
(58) Field of Search .................................. 426/540, 655; 8/438, 646; 424/574

(56) References Cited

U.S. PATENT DOCUMENTS

| | | | |
|---|---|---|---|
| 1,325,971 | * | 12/1919 | Asaki . |
| 1,479,533 | * | 1/1924 | Cooney . |
| 2,684,303 | * | 7/1954 | Leonard et al. . |
| 3,956,508 | * | 5/1976 | Mitchell et al. . |
| 3,956,511 | * | 5/1976 | Mitchell et al. . |
| 4,022,924 | * | 5/1977 | Mitchell et al. . |
| 4,208,442 | * | 6/1980 | Evans et al. . |
| 4,263,333 | * | 4/1981 | Maing et al. . |
| 4,277,379 | * | 7/1981 | Hermann et al. . |
| 4,430,356 | * | 2/1984 | Ohyabu et al. . |
| 4,431,628 | * | 2/1984 | Gaffar . |

(List continued on next page.)

FOREIGN PATENT DOCUMENTS

| | | | |
|---|---|---|---|
| 63-240762 | * | 10/1988 | (JP) . |
| 1152162 | * | 6/1989 | (JP) . |
| 5-9395 | * | 1/1993 | (JP) . |
| 5-43811 | * | 2/1993 | (JP) . |
| 7-46970 | * | 2/1995 | (JP) . |
| 9-285275 | * | 11/1997 | (JP) . |
| 2000004844 | * | 1/2000 | (JP) . |
| WO 98/42212 | | 10/1998 | (WO) . |

OTHER PUBLICATIONS

Walford, "Developments in Food Colours—2", pp. 196–197, 1984.*

Hawley'Condensed Chemical Dictionary, Twelfth Edition, p. 218, 1993.*

Derwent Publications Ltd., XP002095093 Database WPI Section Ch, Week 8930, London GB (1989).

Patent Abstracts of Japan, Cuttlefish Ink Powder And Forming Method Thereof, vo. 017, No. 345, Jun. 30, 1993.

Patent Abstracts of Japan, Cuttlefish Ink Powder And And Formation Thereof, vol. 017, No. 274, May 27, 1993.

Primary Examiner—Cynthia L. Nessler
(74) Attorney, Agent, or Firm—Robert M. Schwartz

(57) ABSTRACT

The process is based on the stabilization of a natural colorant such as cephalopod ink and is carried out in two phases, a microbiological stabilization and a chemisal stabilization, the first being carried out between 80 and 90° C. and the chemical stabilization being carried out by mixing with chemical absorbents such as plant carbon and a cellulose hydrolisate, and incorporating a common salt, medicinal plant carbon, cellulose hydrolisate and water, while providing for a stabilization time prior to packaging. The present invention can be used to obtain extruded substitute products such as the simulation of the backs, eyes and eye spots of squids and the colour of the legs and the degraded bicolor of calamars.

5 Claims, 1 Drawing Sheet

U.S. PATENT DOCUMENTS

| | | | |
|---|---|---|---|
| 4,475,919 | * | 10/1984 | Woznicki et al. . |
| 4,481,226 | * | 11/1984 | Crosby et al. . |
| 4,584,204 | * | 4/1986 | Nishimura et al. . |
| 4,806,360 | * | 2/1989 | Leong et al. . |
| 4,855,144 | * | 8/1989 | Leong et al. . |
| 5,084,283 | * | 1/1992 | Oxley et al. . |
| 5,114,724 | * | 5/1992 | Bottero . |
| 5,157,075 | * | 10/1992 | Kanai et al. . |
| 5,225,435 | * | 7/1993 | Pawelek et al. . |
| 5,240,715 | * | 8/1993 | Ahene et al. . |
| 5,458,892 | * | 10/1995 | Yatka et al. . |
| 5,487,903 | * | 1/1996 | Yokoyama et al. . |
| 5,538,752 | * | 7/1996 | Blanchette et al. . |
| 5,562,642 | * | 10/1996 | Smith et al. . |
| 5,576,039 | * | 11/1996 | Lewis . |
| 5,637,337 | * | 6/1997 | Ueda et al. . |
| 5,811,162 | * | 9/1998 | Hammer et al. . |
| 5,863,594 | * | 1/1999 | Eizmendi et al. . |
| 5,919,559 | * | 7/1999 | Nakano et al. . |
| 5,954,866 | * | 9/1999 | Ohta et al. . |

* cited by examiner

PROCESS FOR PRODUCING A FOOD COLORANT, COLORANT THUS OBTAINED AND USES THEREOF

This application is a national stage application, filed under 35 U.S.C. 371, of international application no. PCT/ES98/00314, filed Nov. 19, 1998.

OBJECT OF THE INVENTION

The invention currently put forward consists of a procedure for obtaining a food colorant, as well as this colorant itself and food substitutes obtained using it, from among black food colorants, based on the stabilisation of a natural colorant such as cephalopod ink and carrying out in two stages, a microbiological stabilisation and a chemical stabilisation.

The process of microbiological stabilisation is a cleaning and termination treatment between 80 and 90° C. of this natural ink, while the chemical stabilisation requires mixing with chemical absorbents such as vegetal carbon and a cellulose hydrolisate, as well as a previous stabilisation time prior to packaging.

Its composition is as follows: 15–35% of a mass of stabilised ink; 2–10% of common salt (sodium chloride); 2–7% of medicinal vegetal carbon; 1–3% hydrolised cellulose. (carboxymethyl cellulose) and water to 100%.

BACKGROUND OF THE INVENTION

The colorants, which are considered the least indispensable additives, are used mainly to normalise the colour of a foodstuff or drink.

However, this tendency has changed with the appearance of the agro-food market of natural food substitutes, increasing its application to the decoration of prepared proteins, to make them more attractive and similar to the original product.

Traditionally, vegetable extracts have been used as colorants of natural origin β-carotenes, beetroot juice, fruit juices . . . ) and synthetic colorants, which are subject to very extensive toxicological studies.

Within this latter class of colorants, there are very few black coloured ones. More exactly, the only ones that are admitted for use in the European Union are those of vegetal carbon itself, Brilliant Negro BN and Black 7984, these last two being subject to strong restrictions both regarding their use (in the case of Black 7984 it can only be used with certain types of product) and in the daily admitted dose (D.A.D.) of less that 0.75 mg/Kg of bodyweight for Brilliant Negro BN that, furthermore, cannot be used in foods that may be heated during their preparation.

On the other hand the use of the secretary glands of the cephalopod (inks) in the whole of the North of Spain is widely known, being extensively used in the nouveau cuisine or miniature cooking, that use large quantities of "small cuttlefish ink".

However, the natural product is not stable and is quickly degraded making its use not a viable option as an industrial food colouring. This degradation is due mainly to the high microbiological load that the natural product contains and the enzymatic/toxic activity derived from the repellent nature of the cephalopod ink.

On the other hand black colorants of animal origin have not been used in general in the agro-food industry due to the fact that the consumption of food of this colour is limited to the northern half of Spain, the Levantine coast (black rice) and some Asian countries.

The applicant is unaware of the existence of black food colorant, obtained from cephalopod ink by means of a double stabilisation process with the microbiological and chemical stages.

DESCRIPTION OF THE INVENTION

The invention object of the present specification relates to a procedure for obtaining a food colorant and substitutes obtained with it, from among black food colorants, based on the stabilisation of a natural colorant such as cephalopod ink, that will be denominated cephalopod black hereinafter, this procedure allowing the natural ink originating from these species, generally of commercial use, to be stabilised in such a way that it can be used as a food colorant.

For these ends, the bags of ink or secretary glands of cephalopods such as cuttlefish, pota, octopus or any species of cephalopod that has secretary glands, are cleaned by hand, strained and mechanically ground, until a homogeneous mass is obtained.

The mass so obtained is submitted to a thermal treatment, then allowed it to cool to room temperature in the same container, conveniently covered.

Simultaneously water, vegetal carbon of medicinal quality (activated carbon), cellulose hydrolisate and common salt (sodium chloride) are mixed in a homogenising apparatus.

The homogenate of the mass is kept for a time lying between one and three hours and, then, the two masses are mixed in a mixing/cutting machine until a homogenous product is obtained. From this moment the product is now stable and can be packaged.

Most of the existing food colorants of vegetal or synthetic origin and derived from those of other colours. Those of animal origin do not exist. Apart from this, the black colour only has the three cited sources, and hence their enormous interest.

On one hand, and with respect to the three black colorants, it has the advantage that its consumption, in a natural form, has been practised on a massive scale for generations, without observable accumulative toxic effects and the only cases of known intoxication are those in which the natural product has not be treated thermally, an aspect that is addressed in the present invention.

Thus the product so obtained, cephalopod black, is homogeneous and perfectly applicable in industrial machinery for colouring the surface of food masses.

It has the important advantage compared to the natural product, that of chemical stability, as it does not form salts, lose its colour and the activated carbon neutralised the possible toxic substances. Its microbiological stability is assured by the thermal process that reduces the populations of micro-organisms and their enzymatic activity. All this is achieved without loss of organoleptic properties.

Finally, this is a very important innovation in the area of food colorants of industrial application, as it is a colorant that is neither of vegetal origin nor of synthetic origin, but rather stabilised animal origin. There is no reference in the agrofood market.

DESCRIPTION OF THE DRAWINGS

To complete the description that is being given and with the aim of facilitating a better and easier understanding of the characteristics of the invention, the present specification is accompanied, as an integral part thereof, by a diagram of the procedure in which, by way of illustration and never limiting, the following has been represented.

PREFERRED EMBODIMENT OF THE INVENTION

Figure 1:
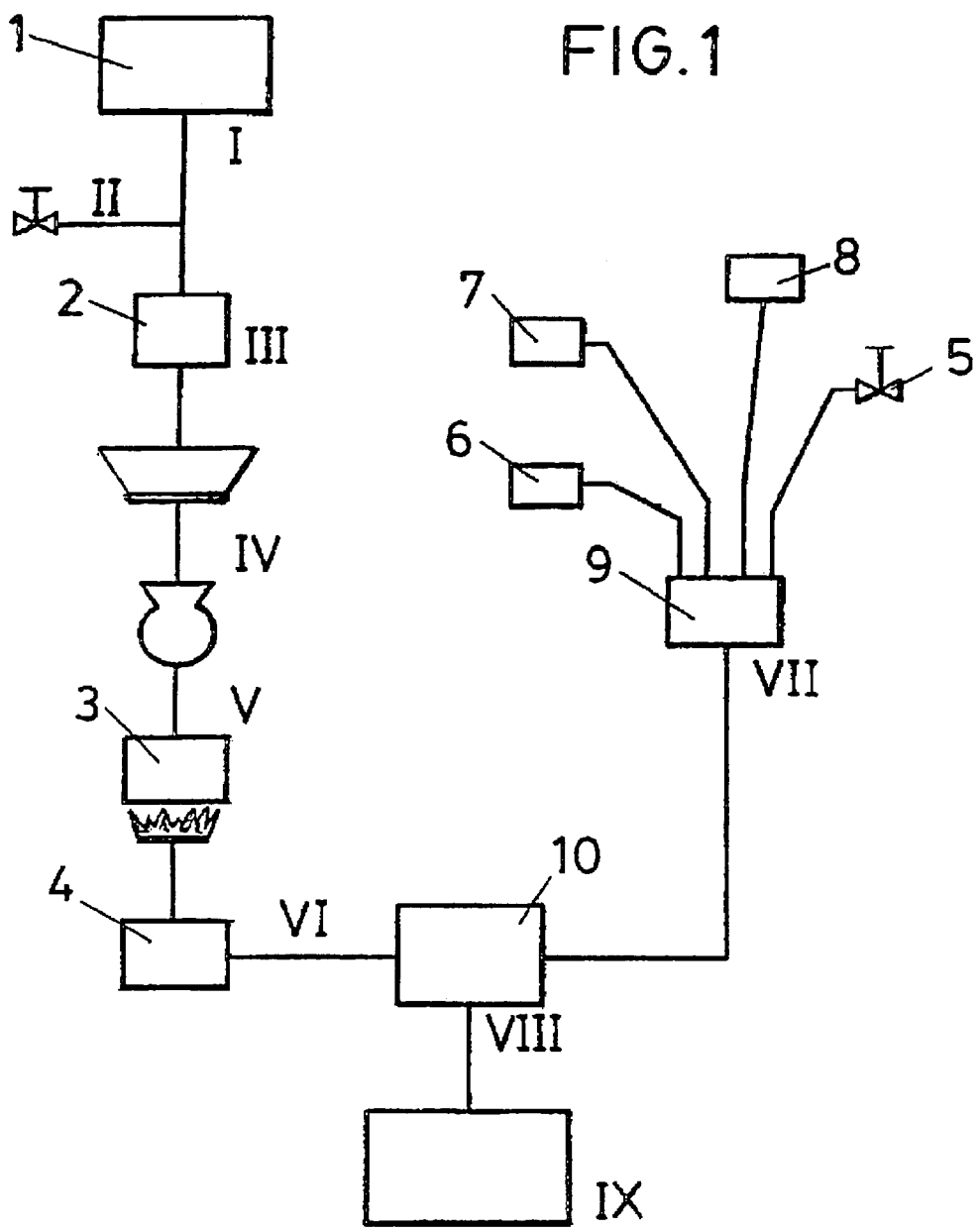
FIG. 1 shows, in the line of action on the left, the manipulation of the animal product and thermal treatment thereof, while the line on the right describes the incorporation of the other components and their mixing, both lines joining in the homogenisation stage and their subsequent packaging.

In view of what had previously been stated, the present invention relates to a procedure for obtaining a food colorant and the colorant so obtained, from among the black food colorants, this procedure for obtaining cephalopod black allowing its use as a food colorant, this procedure being particularly characterised because the secretary glands of ink (2) of the cephalopods (1) are extracted (I), washed (II) by hand, strained (III) and ground (IV) mechanically, until a homogeneous mass is obtained (3), that is submitted to a thermal treatment (V), for between a minimum of 2 minutes and a maximum of 20 minutes, at a temperature lying between 80° and 90° C., then proceeding to cooling (VI) the thermally treated mass (4), to room temperature, in the same recipient in which the thermal treatment has been carried out, which is conveniently covered.

On the other hand, and simultaneously to this above process, water (5), vegetal carbon (6) of medicinal quality (activated carbon), cellulose hydrolisate (7) and common salt (8) (sodium chloride) are mixed in a homogenising apparatus, for a period of time lying between one and three hours, mixing (VIII) the homogenised mass (9) with the thermalised mass (4) in a mixing/cutting machine until cephalopod black is obtained (10) and then proceeding to packaging thereof (IX).

The finished product shows the following compositional formulation: 15–35% of stabilised ink material; 2–10% of common salt (sodium chloride); 2–7% medicinal vegetal carbon; 1–3% cellulose hydrolisate. (carboxy methyl celluloses) and water to make up 100%.

The compositional formula alternatively permits the substitution of the cellulose hydrolisate (carboxymethylcellulose) by any other food thickener, such as agar, xanthane gums or similar substances.

Similarly and as a function of the anticipated use of the colorant, stabilising and/or preservative additives or spices may be added independently of the original formula, for example paprika may be added to colour the cephalopod substitutes.

The Vegetal Carbon that forms part of the compositional formula should comply with the purity and quality requirements as well as overcome a control assay of its adsorption capacity for its use as a colorant according to that described below.

Following Guideline USP-23, page 330, the activated carbon powder, of molecular weight of practically 12, has to be insoluble in water and chloroform, its aqueous suspension should show a neutral reaction to indicator paper, should lack chlorides and sulphates, and also heavy metals and arsenic, its sulphurous ashes should be less than $\leq 5\%$, the substances soluble in acid $\leq 3.5\%$, its iodine index should be $\geq 400$, its capacity for absorption should be such that 0.2 g should decolourise, at least, 20 ml of a 1.5% solution of methylene blue, and it should also have a specific surface of the order of 900 m²/g, while the particle size should allow a maximum sieve rejection of 80 mcm $\leq 10\%$.

EXAMPLES OF PREFERENTIAL USE OF THE COLORANT

The industrial black food colorant from cephalopod can be applied to any foodstuff in bulk or to the surface. In the examples described below it is applied in both forms.

Baby eel substitute: From a food substitute (for example surimi), a long piece is extruded with form of baby eel, supplementing the extrusion machinery (horizontal or vertical) with a dose of the product. In this way degraded areas of colour can be obtained in the formation of the initial piece, simulating the black or grey backs characteristic of these animals.

Similarly, if a micro-nozzle is placed at the extruder or any other similar system, black stains can be obtained that simulate eyes and ocelli. The coloration thus obtained is resistant to washing and thermal treatment.

Small cuttlefish substitute: In the system for moulding the food dough the colorant is partially mixed (either alone or with paprika). The extrusion can be carried out with the mixture of doughs or of colorants thus obtaining a two-coloured substance which is characteristic of these animals when cooked. Additionally, the colorant in the dough can be combined with the surface colorant to obtain a simulation of the colour of the tentacles of cooked small cuttlefish.

The description is not made any more extensive, on the understanding that any expert in this art would have enough information to understand the scope of the invention and the advantages derived therefrom, and to proceed to reproduce the invention.

It is understood that, if the invention is not essentially altered, both changes in the equipment used and their arrangement for incorporating the component elements may vary within the characterisation of the invention.

The terms used during the specification and the meaning attributed to them should always be considered in a non-limiting manner.

What is claimed is:

1. A process for obtaining a stabilized black food colorant by stabilization of ink from naturally occurring dyes, comprising the steps:
   i. extracting ink from the glands of cephalopods,
   ii. preparing the ink by incorporating the steps of washing, straining, and grinding mechanically the extracted ink to a point where a homogeneous mass is obtained,
   iii. submitting the mass to a thermal treatment of 80–90° C. for a period of 2–20 minutes,
   iv. cooling the mass to room temperature and concurrently mixing with a homogenized preparation comprised of water, vegetal carbon in an amount effective to stabilize the black food colorant, at least one food thickener selected from the group consisting of hydrolyzed cellulose, modified food gums and agar, and sodium chloride, said preparation having been homogenized for 1–3 hours,
   v. mixing the mass with the homogenized preparation in a mixing and cutting machine whereby a stabilized cephalopod black colorant is obtained.

2. The process of claim 1, in which said stabilized black food colorant consists essentially of:
   15–35% stabilized ink; 2–10% sodium chloride; 2–7% medicinal vegetal carbon, 1–3% cellulose hydrolyzate and water.

3. The process of claim 1, in which said food thickener is cellulose hydrolyzate.

4. The process of claim 1, in which the thickener is selected from the group consisting of modified food gums and agar.

5. The process of claim 1, wherein said colorant is resistant to aqueous and thermal degradation and discoloration.

* * * * *